Jan. 24, 1928.  1,657,360
A. R. KEELER
TRACTION MACHINE
Filed March 24, 1924  4 Sheets-Sheet 4
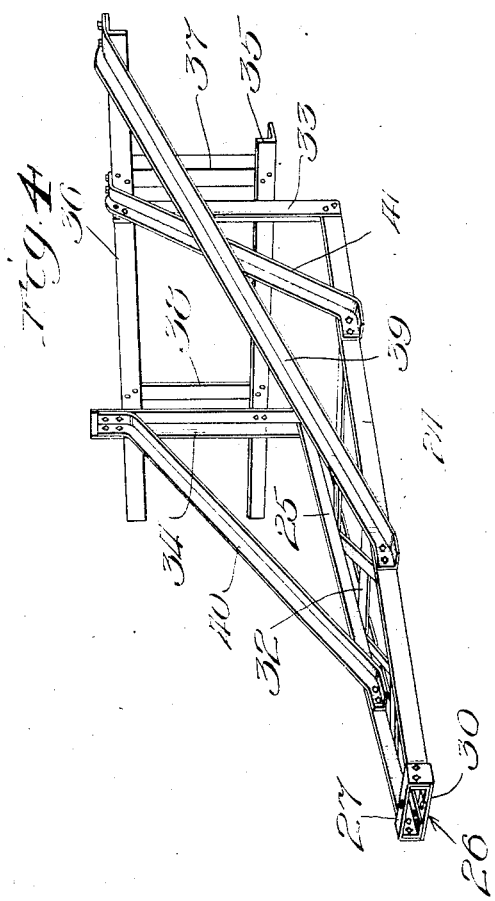
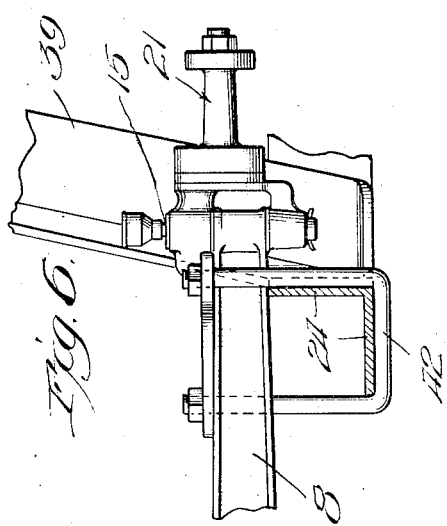
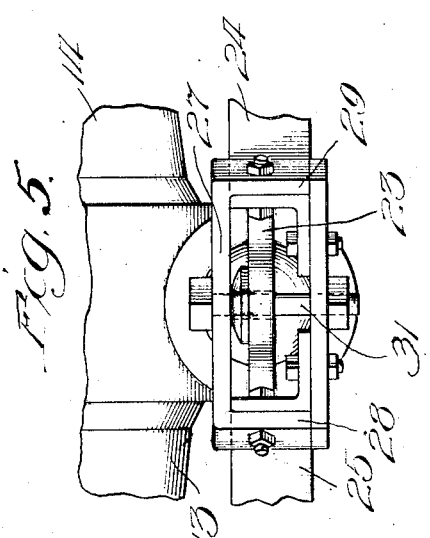
Inventor:
Alonzo R. Keeler Patented Jan. 24, 1928.

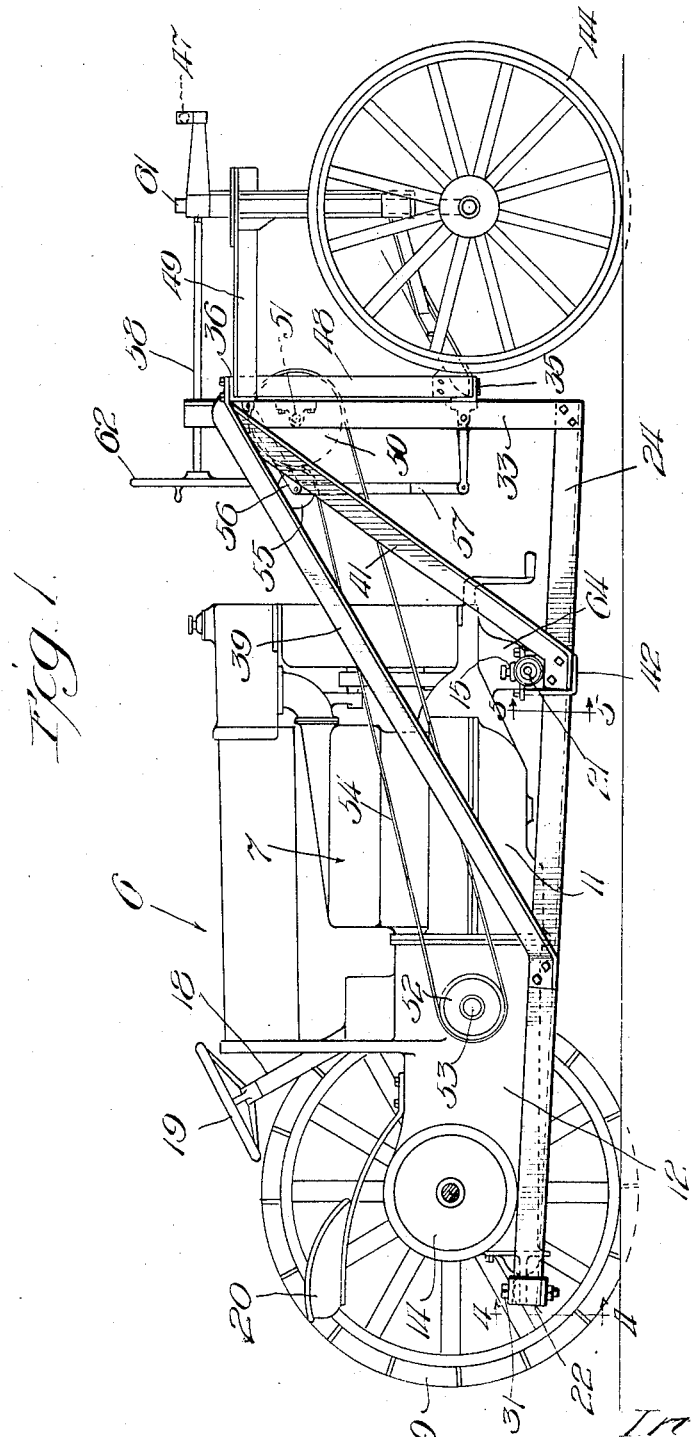

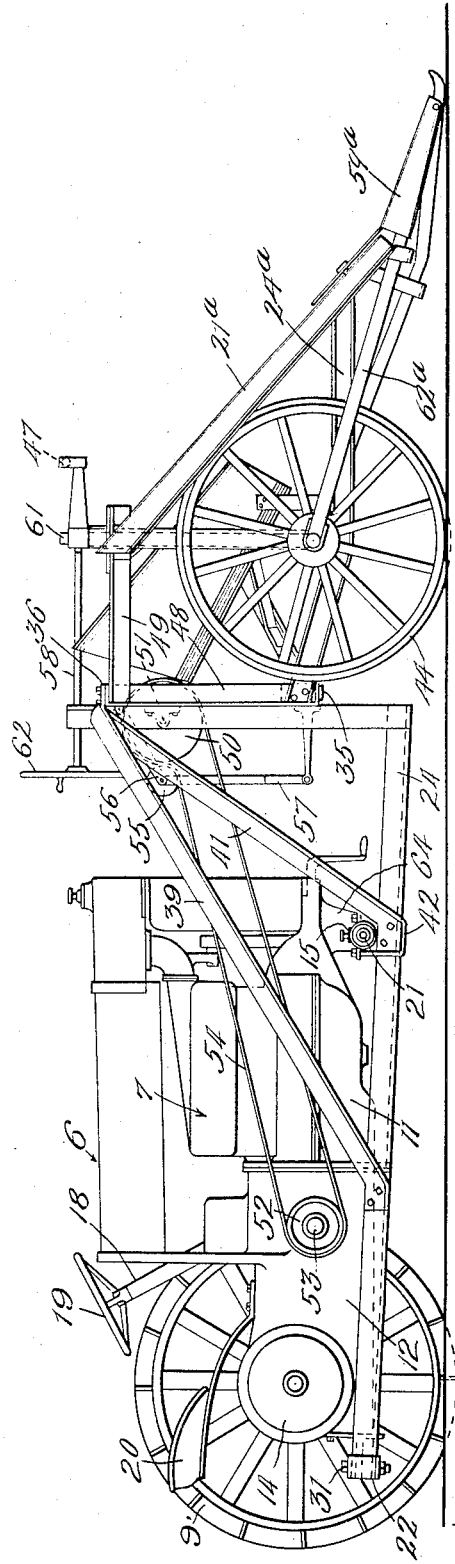

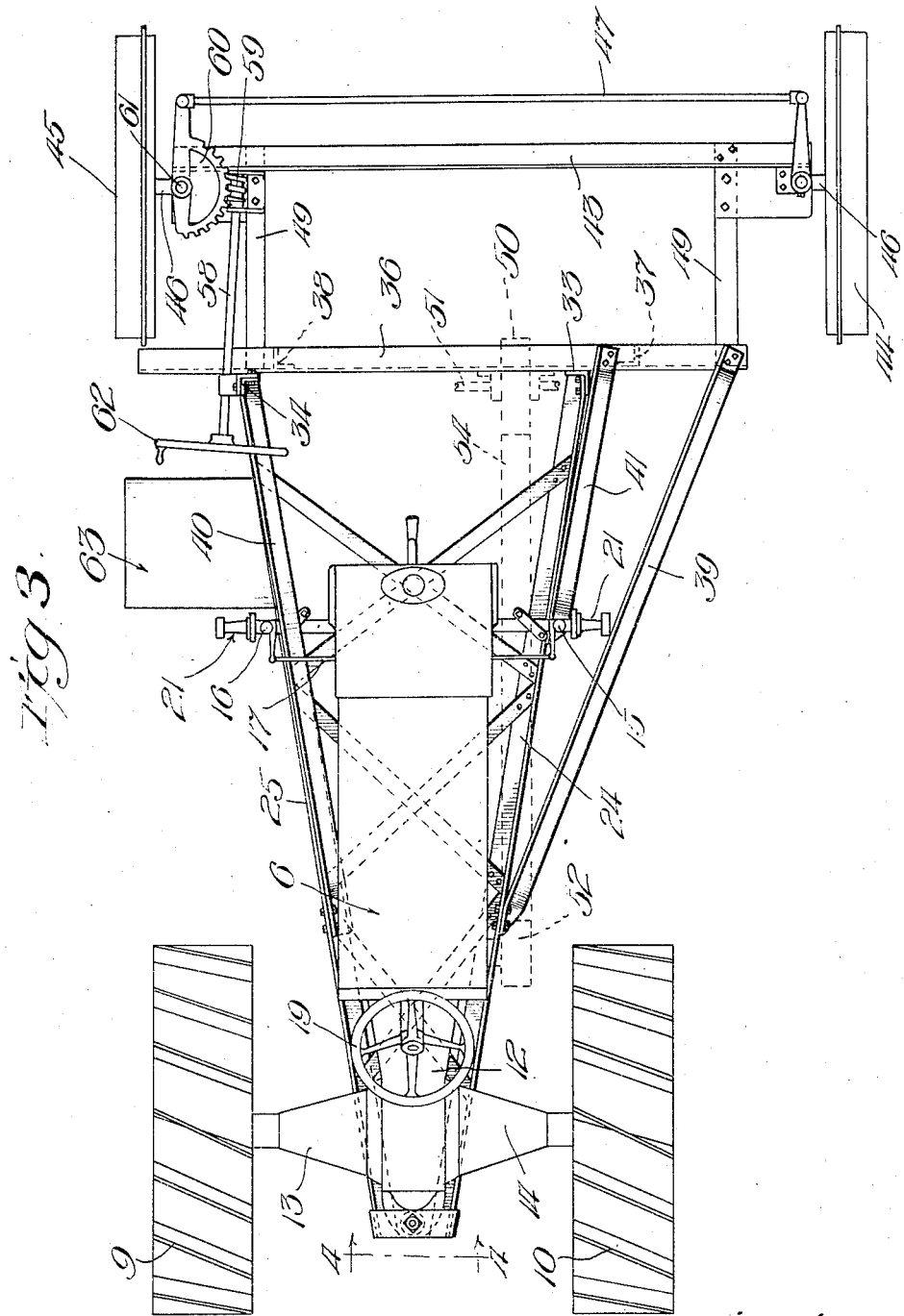

1,657,360

UNITED STATES PATENT OFFICE.

ALONZO R. KEELER, OF ALTONA, ILLINOIS.

TRACTION MACHINE.

Application filed March 24, 1924. Serial No. 701,476.

This invention has to do with improvements in traction machines and the like. The invention has reference particularly to improvements in coupling devices, etc., whereby the traction engine or driving element may be connected to the driven element.

Still more particularly the invention has to do with improvements in the construction of devices of the above character in which the driven element is intended to be pushed along by the traction element, the traction element for this purpose being placed behind the driven element which is in front.

Still more particularly the invention relates to improvements in devices of the foregoing category in which the driven element comprises an agricultural implement of selected type, as for example a corn gatherer machine; and in which the traction element takes the form of a typical and well known gasoline engine driven tractor or a portion thereof.

One of the objects of the present invention is to provide a connecting or coupling device whereby the agricultural implement may be readily connected to the traction engine by removing the front steering wheels of the traction engine and bringing the coupling device into proper assembled relationship. In this connection it is an object of the invention to provide a coupling device which may be readily coupled to the traction engine in such a manner as to provide effective transfer of a very heavy draw bar push, while at the same time carrying the weight of the front portion of the traction engine to best advantage and in a very direct manner taking account of the device and construction of the traction engine itself.

A further object in connection with the foregoing is to provide an arrangement such that when the traction engine and agricultural implement are coupled together they will establish a complete operative assembly of mechanisms which can be properly steered and controlled in all respects from the traction engine itself. This will make it possible to continue to operate the combined unit as a one man machine with corresponding economy of labor and cost of operation.

A further object of the invention is to provide a coupling device having particular reference to the general arrangement and construction of the agricultural implement as well as the traction engine, and in this connection to make provision for steering the combined unit by the use of the wheels of the agricultural implement. When the traction engine and agricultural implement are coupled together they will constitute a unitary structure in which the steering effect is obtained by the use of the wheels of the agricultural implement, which at such time also support the load of the front portion of the traction element.

Other objects and uses of the invention will appear from a detailed description of the same, which consists in the features of construction and combinations of parts hereinafter described and claimed.

In the drawings:

Figure 1 shows a side elevation of an assembled machine embodying the features of the present invention, and it shows the coupling device itself as joining together a traction engine and an agricultural implement, the front portion of the agricultural implement being broken away so as to shorten up and simplify the figure; and both the traction engine and the agricultural implement being in relatively light lines as compared to the coupling device;

Fig. 2 shows a side elevation of an assembled machine embodying the features of the present invention, and it shows the coupling device itself as joining together a traction engine and an agricultural implement; the agricultural implement illustrated in this figure being similar in construction to that disclosed in my earlier Patent No. 1,219,327, issued to me March 13, 1917, but of a slightly modified form.

Fig. 3 shows a plan view corresponding to Fig. 1;

Fig. 4 shows a perspective view of the coupling device itself;

Fig. 5 shows a fragmentary back view of the draw bar connection at the rear end of the coupling device itself, being taken on the line 4—4 of Figs. 1 and 2, looking in the direction of the arrows, and on enlarged scale; and Fig. 6 shows a fragmentary cross section on the line 5—5 of Fig. 1, looking in the direction of the arrows, and on enlarged scale.

In the drawings I have illustrated a traction engine 6 of the type well known as the Fordson tractor, but it will be evident that other forms of tractor may be substituted in place thereof. This tractor includes the engine 7, the front axle 8, and the rear traction wheels 9 and 10.

The engine base 11 is connected to the frame member 12 which reaches rearwardly and has the axle mountings 13 and 14 which engage the axle shafts, and which mountings carry the traction wheels at their outer ends.

The steering knuckles 15 and 16 are pivoted to the ends of the front axle 8 in the well understood manner, being connected together by the cross link 17 by which they are articulated in unison. The steering post 18 reaches upwardly at the rear end of the traction engine and carries the steering wheel 19 which is placed at a convenient point with respect to the driver's seat 20. The front wheels are carried on suitable hubs 21 which are journaled on the knuckles previously referred to, so that in the ordinary use of the tractor the steering wheels are articulated.

The rear end of the frame member 12 is provided with a draw bar connection 22, the construction of which is shown in detail in Fig. 5. It usually includes a rearwardly extending tongue 23 having a vertical transverse hole through which may be dropped a draw bar pin or other connecting medium.

The traction engine construction thus far described is old and well understood in the art, and I do not claim the same per se. Furthermore, I do not intend to limit my present invention to use in connection with this particular form of tractor.

The coupling element itself is well illustrated in Fig. 4. It includes the horizontal side bars 24 and 25 which are of proper length to reach beneath the traction engine to a point adjacent to the draw bar already mentioned. The rear ends of these side bars 24 and 25 are joined rigidly together by an encircling collar 26. This collar preferably includes a U-shaped top section 27, the side arms 28 and 29 of which reach down at the outside faces of the side bars 24 and 25; together with a bottom plate 30. The opening presented by the assembled collar is sufficiently large to easily accommodate the draw bar tongue 23, so that upon dropping a bolt 31 down through the collar and through the hole of the draw bar tongue the parts are effectively joined together.

The side bars 24 and 25 are preferably in the form of angle sections so as to present vertical side flanges and bottom horizontal flanges as shown in Figs. 3, 4 and 5 in particular. The bottom plate 30 of the collar 26 is thus easily connected to the bottom flanges of the side bars.

The side bars are preferably flared away from each other in their forward portions, so that their front ends are separated a substantial distance. The side bars are also secured rigidly together by suitable lattice work generally indicated by the numeral 32.

At their front ends the side bars carry the vertical posts 33 and 34 respectively. These also may conveniently take the form of angle sections. Horizontal bars 35 and 36 are set across the posts 33 and 34, being securely fastened to the posts, and supplemental reinforcements 37 and 38, are illustrated, joining the bars 35 and 36 together.

The bars 35 and 36 are preferably of a length such as to establish the desired width of the front end of the coupling unit. For this purpose said bars preferably reach a considerable distance beyond the positions of the posts 33 and 34.

Side braces 39 and 40 reach from the rear portions of the side bars 24 and 25 upwardly and forwardly to the front portion of the structure so as to brace the same; and for this purpose the bar 39 reaches to the outer end of the top cross bar 36, and the brace 40 reaches to the upper end of the post 34. A supplemental brace 41 is also illustrated between the top cross bar 36 at a point beside the top end of the post 33 and reaching down to the side bar 24 at a point well in advance of the connection of the brace 39.

Comparison of the various figures will show that the braces, etc., are so arranged as to allow the front portion of the traction engine to set therein as within a cradle. When the collar 26 is connected to the coupling or draw bar 23 of the traction engine, the front axle of the traction engine rests upon and is supported by the side bars 24 and 25, the front wheels of the traction engine having been removed from the hubs 21.

With the traction engine in this position its front axle 8 is rigidly secured to the side bars 24 and 25 by the use of clips 42 as shown in detail in Fig. 6.

The particular form of agricultural implement herein illustrated is a corn gatherer of the general type disclosed in Letters Patent of the United States No. 1,219,327, issued to me March 13, 1917; but the form illustrated herein differs from that shown in the aforesaid Letters Patent in certain details of construction. Manifestly, other forms of agricultural implements may be used in place thereof.

This corn gatherer includes an axle 43 to the ends of which are journaled and swivelled the land wheels 44 and 45 by the use of steering knuckles 46. These steering knuckles are joined together by a cross link 47 whereby they are articulated in unison for steering purposes.

This corn gatherer also includes a rear frame section including posts 48 and top frame bars 49 which together establish a more or less rectangular frame.

The front cross bars 35 and 36 of the coupling element are so positioned that they will readily receive the rear portion of the frame of the corn gatherer to which they may be attached in any convenient manner as by bolts, clips, etc.

The details of construction of the corn gatherer itself are not illustrated, since they constitute no portion of the disclosure of the present invention, but I will state that as a general proposition, agricultural implements and especially corn gatherers require the application of a suitable form of power driving mechanism. For this purpose, I have illustrated the pulley 50 which is journaled to the rear portion of the frame of the corn gatherer and includes a shaft 51. Upon driving the pulley and thus the shaft, the necessary power is delivered to the corn gatherer to operate its rolls, elevators, etc.

The corn gatherer illustrated in the combined view of Fig. 2 being of the general form shown in my earlier Patent No. 1,219,327, includes one or more aprons 21ª which slant upwardly from the shoes 59ª adjacent to their lower ends, said shoes being carried by reach bars 62ª running back into the frame of the machine and permitting deflection of the shoes with a swinging movement in accordance with the disclosures of the aforesaid earlier patent. This structure also includes one or more frame bars 24ª the rear portions of which are connected to the horizontal bar 35 of the cradle or push unit construction.

I have shown the traction engine as provided with a pulley 52 mounted upon the sidewise extending drive shaft 53 which is conveniently driven from the traction engine motor 7 in the well understood manner. A belt 54 may be passed over the driving and driven pulleys 52 and 50 respectively; and an idler 55 may be allowed to rest upon the belt so as to take up the slack when the driving connection is to be effected. For this purpose the idler 55 is carried by a rock arm 56 pivoted to the rear portion of the frame of the corn gatherer, and upon pulling down on a linkage 57 the tension of the belt is sufficiently increased to establish the driving connection.

When the traction engine and implement are joined together the steering is to be accomplished by the use of the wheels 44 and 45. For this purpose, I have provided a rearwardly reaching shaft 58 on the upper portion of the implement frame, the same having a worm 59 meshing with a worm segment 60 on the upper end of the shaft 61 which reaches down to one of the steering knuckles. The rear end of the shaft 58 carries a steering wheel 62 located at a point convenient of access to the operator standing on the platform 63 which is carried by the side bar 25 of the coupling member.

It will be understood that when the two machines are coupled together the usual traction engine steering wheel 19 becomes ineffective, and therefore does not need to be reached by the driver. If desired, suitable extensions for the throttle, clutch, transmission, etc., may also be carried to points convenient of access from the platform 63, although I have not illustrated the same in detail in this case since manifestly many suitable forms of construction might be used, if desired.

I wish to point out the fact that the traction engine itself is usually provided with a swivel connection 64 between the front end of its frame and the front axle 8, so that the front axle can articulate about a longitudinal axis. Inasmuch as the rear end of the coupling is connected to the draw bar tongue by a loose connection it follows that the entire traction engine may swing about a longitudinal axis with respect to the coupling member, and therefore also with respect to the agricultural implement. It thus follows that the traction engine and implement are connected together by a three point suspension and thus readily accommodate themselves to irregularities in the surface of the land over which they are traveling.

While I have herein shown and described only a single embodiment of the features of my present invention, still I do not intend to limit myself to the same, except as I may do so in the claims.

I claim:

1. The combination with a traction machine having a front axle swivelly connected to the front portion of the body of the machine, rear traction wheels, a rearwardly extending draw bar connection, and suitable driving mechanism, and an agricultural implement immediately in advance thereof including a frame, a pair of steering land wheels at the sides of the rear portion thereof and rearwardly extending steering control mechanism therefor, of a traction connection extending from the draw bar connection beneath the traction machine and to the rear portion of the agricultural implement, said traction connection comprising a pair of longitudinally extending side beams, and suitable reinforcing cross members between them constituting a horizontal frame of length and width to reach beneath the traction machine from the front thereof beneath the front axle and to the draw bar connection thereof, vertical posts secured to the front end of said horizontal frame in advance of the traction machine, cross frame bars secured to said posts, and reinforcing frame bars reaching diagonally upwards from the frame side beams to the posts, constituting a cradle for the front portion of the traction machine, together with a rectangular collar at the rear end of the horizontal frame adapted to receive the draw bar connection of the traction machine and permit swivel movement about a horizontal axis, a loose pin connection between the collar and the draw bar connection, means for securing the front axle of the agricultural implement upon the horizontal frame of the traction connection, and means for securing the front cross frame bars of the traction connection to the frame of the agricultural implement, substantially as described.

2. The combination with a traction machine having a front axle swivelly connected to the front portion of the machine, rear traction wheels, a rearwardly extending draw bar connection, and suitable driving mechanism, and an agricultural implement immediately in advance thereof including a frame, a pair of steering land wheels at the sides of the rear portion thereof and steering control mechanism therefor, of a traction connection extending from the draw bar connection beneath the traction machine and to the rear portion of the agricultural implement, said traction connection comprising a pair of longitudinally extending side beams, and suitable reinforcing cross members between them constituting a horizontal frame of length and width to reach beneath the traction machine from the front thereof beneath the front axle and to the draw bar connection thereof, vertical posts secured to the front end of said horizontal frame in advance of the traction machine, cross frame bars secured to said posts, and reinforcing frame bars reaching diagonally upwards from the frame side beams to the posts, constituting a cradle for the front portion of the traction machine, together with a connector at the rear end of the horizontal frame adapted to engage the draw bar connection of the traction machine and permit rocking movement between the traction machine and the traction connection about a horizontal axis, means for securing the front axle of the argricultural implement upon the horizontal frame of the traction connection, and means for securing the front cross frame bars of the traction connection to the frame of the agricultural implement, substantially as described.

3. The combination with a traction machine having a front axle swivelly connected to the front portion of the machine, rear traction wheels, a rearwardly extending draw bar connection, and suitable driving mechanism, and an agricultural implement immediately in advance thereof including a frame, a pair of steering land wheels at the sides of the rear portion thereof and steering control mechanism therefor, of a traction connection extending from the draw bar connection beneath the traction machine and to the rear portion of the agricultural implement, said traction connection comprising a pair of longitudinally extending side beams, and suitable reinforcing cross members between them constituting a horizontal frame of length and width to reach beneath the traction machine from the front thereof beneath the front axle and to the draw bar connection thereof, a vertical extension on the front end of said horizontal frame, reinforcing frame bars reaching diagonally upwards from the horizontal frame to the vertical extension constituting a cradle for the front portion of the traction machine, together with a connector at the rear end of the horizontal frame adapted to engage the draw bar connection of the traction machine and permit rocking movement between the traction machine and the traction connection about a horizontal axis, means for securing the front axle of the agricultural implement upon the horizontal frame of the traction connection, and means for securing the vertical extension of the traction connection to the frame of the agricultural implement, substantially as described.

4. The combination with a traction machine having a front axle swivelly connected to the front portion of the machine, rear traction wheels, a draw bar connection, and suitable driving mechanism, and an agricultural implement immediately in advance thereof including a frame, a pair of steering land wheels at the sides of the rear portion thereof and steering control mechanism therefor, of a traction connection extending from the draw bar connection beneath the traction machine and to the rear portion of the agricultural implement, said traction connection comprising a pair of longitudinally extending side beams, and suitable reinforcing cross members between them constituting a horizontal frame of length and width to reach beneath the traction machine from the front thereof beneath the front axle and to the draw bar connection thereof, a vertical etxension at the front end of said horizontal frame, and a connector at the rear end of the horizontal frame adapted to engage the draw bar connection of the traction machine and permit rocking movement between the traction machine and the traction connection about a horizontal axis, means for securing the front axle of the agricultural implement upon the horizontal frame of the traction connection, and means for securing the vertical extension to the frame of the agricultural implement, substantially as described.

5. The combination with a traction machine having a front axle swivelly connected to the front portion of the machine, rear traction wheels, a draw bar connection, and suitable driving mechanism, and an agricultural implement immediately in advance thereof including a frame, a pair of steering land wheels at the sides of the rear portion thereof and steering control mechanism therefor, of a traction connection extending from the draw bar connection beneath the traction machine and to the rear portion of the agricultural implement, said traction connection comprising a horizontal frame of length and width to reach beneath the traction machine from the front thereof beneath the front axle and to the draw bar connection thereof, and a connector at the rear end of the horizontal frame adapted to engage the draw bar connection of the traction machine and permit rocking movement between the traction machine and the traction connection about a horizontal axis, means for securing the front axle of the agricultural implement upon the horizontal frame of the traction connection, and means for securing the front portion of the traction connection to the frame of the agricultural implement, substantially as described.

6. As a new article of manufacture, a traction connection for the purpose specified comprising in combination a horizontal frame including a pair of side bars together with cross frame members joining them rigidly together, a collar at the rear end of said horizontal frame adapted to receive a draw bar connection, a pair of vertical corner posts secured to the front corners of the horizontal frame, transverse frame bars carried by said posts, and diagonal reinforcements between the posts and the horizontal frame, substantially as described.

ALONZO R. KEELER.